(12) United States Patent
Foster

(10) Patent No.: US 9,137,443 B2
(45) Date of Patent: Sep. 15, 2015

(54) FAST ESTIMATION OF BINARY DATA LENGTH USING MEMORY CORRUPTION

(75) Inventor: Brett Foster, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 56 days.

(21) Appl. No.: 13/246,033

(22) Filed: Sep. 27, 2011

(65) Prior Publication Data

US 2012/0278347 A1  Nov. 1, 2012

Related U.S. Application Data

(60) Provisional application No. 61/479,227, filed on Apr. 26, 2011.

(51) Int. Cl.
*G06F 17/30* (2006.01)
*H04N 5/232* (2006.01)
*H04N 19/68* (2014.01)

(52) U.S. Cl.
CPC ............ *H04N 5/23293* (2013.01); *H04N 19/68* (2014.11)

(58) Field of Classification Search
None
See application file for complete search history.

(56) References Cited

U.S. PATENT DOCUMENTS

| | | | |
|---|---|---|---|
| 3,943,495 A | 3/1976 | Garlic | |
| 6,119,213 A * | 9/2000 | Robbins | ........................ 711/202 |
| 6,629,101 B1 | 9/2003 | Enokida | |
| 6,687,768 B2 | 2/2004 | Horikomi et al. | |
| 6,950,043 B2 | 9/2005 | Kikuchi et al. | |
| 7,652,595 B2 | 1/2010 | Niemi et al. | |
| RE42,147 E | 2/2011 | Fimoff et al. | |
| 2003/0190058 A1 * | 10/2003 | Jun et al. | ........................ 382/104 |
| 2004/0057545 A1 | 3/2004 | Hayashi | |
| 2005/0131867 A1 * | 6/2005 | Wilson | .............................. 707/3 |
| 2008/0198047 A1 * | 8/2008 | Niemi et al. | ..................... 341/67 |
| 2009/0144348 A1 | 6/2009 | Nishimura | |
| 2009/0190251 A1 | 7/2009 | Yokohata et al. | |
| 2009/0257667 A1 | 10/2009 | Naito | |

(Continued)

FOREIGN PATENT DOCUMENTS

| | | |
|---|---|---|
| CA | 2773405 A1 | 10/2012 |
| CN | 1882966 A | 12/2006 |
| CN | 102761740 A | 10/2012 |

(Continued)

OTHER PUBLICATIONS

Office Action mailed Nov. 1, 2013, in corresponding Canadian patent application No. 2,773,405, 4 pages.

(Continued)

*Primary Examiner* — Tony Mahmoudi
*Assistant Examiner* — Michael Le
(74) *Attorney, Agent, or Firm* — Fish & Richardson P.C.

(57) ABSTRACT

Various embodiments are described herein for a method and related device for processing a first dataset comprising a second dataset and a third dataset in order to locate the third dataset. The second dataset has a variable data length and terminates with an ending marker and the third dataset starts after the ending marker. The method involves preprocessing a memory element by storing a plurality of locater markers, storing the first dataset in the memory element thereby overwriting a portion of the plurality of locater markers, locating which of the plurality of locater markers is closest to the end of the first dataset; and locating the third dataset by searching for the ending marker of the second dataset based on the position of the closest locater marker.

26 Claims, 7 Drawing Sheets

(56) References Cited

U.S. PATENT DOCUMENTS

| | | |
|---|---|---|
| 2010/0265351 A1 | 10/2010 | Kaibara |
| 2010/0328514 A1 | 12/2010 | Hosoe et al. |

FOREIGN PATENT DOCUMENTS

| | | |
|---|---|---|
| EP | 2519006 B1 | 11/2013 |
| RU | 2368005 C2 | 9/2009 |
| SE | 528172 C2 | 9/2006 |
| SE | 531398 C2 | 3/2009 |
| WO | 2005050567 A1 | 6/2005 |
| WO | 2008100206 A1 | 8/2008 |

OTHER PUBLICATIONS

Decision to Grant mailed Oct. 31, 2013, in corresponding European patent application No. 11182993.3, 2 pages.

Certificate of Grant mailed Nov. 27, 2013, in corresponding European patent application No. 11182993.3, 2 pages.

English abstract for CN102761740; published on Oct. 31, 2012 and retrieved on Dec. 16, 2013, 2 pages.

Communication under Rule 71 (3) EPC Intention to Grant mailed Jun. 19, 2013, in corresponding European patent application No. 11182993.3.

Office Action Response mailed Apr. 30, 2013, in corresponding European patent application No. 11182993.3.

"SpeedTags Technology: Enabling amazing performance when capturing" retrieved from website <http://scalado.com/display/en/SpeedTags Technology>, retrieved on Apr. 25, 2013.

Extended European Search Report mailed Jul. 23, 2012, in corresponding European patent application No. 11182993.3.

"Streifenkarte MVV" XP55032839, May 16, 2009, p. 1-p. 2.

"Exchangeable image file format for digital still cameras: Exif Version 2.2", Internet Citation, Apr. 1, 2002, pp. 1-155, XP002501284, Retrieved from the Internet: URL:http://www.kodak.com/global/plugins/acrobat/en/service/digCam/exifStandard2.pdf[retrieved on Oct. 17, 2008] section 4.5.5; p. 61.

English Abstract for CN1882966, published on Dec. 20, 2006 and retrieved on Jul. 11, 2013.

English Abstract for RU2368005, published on Dec. 27, 2007.

English Abstract for SE528172, published on Sep. 19, 2006 and retrieved on Jul. 11, 2013.

English Abstract for SE531398, published on Mar. 24, 2009 and retrieved on Jul. 11, 2013.

Office Action Response mailed Apr. 22, 2014; in corresponding Canadian patent application No. 2,773,405.

Office Action mailed May 20, 2014; in corresponding Chinese patent application No. 201210097677.2.

English Translation of the Office Action mailed May 20, 2014; in Chinese patent application No. 201210097677.2.

Office Action Response dated Oct. 8, 2014; in Chinese patent application No. 201210097677.2.

Office Action issued in Canadian Application No. 2,773,405 on Feb. 17, 2015; 5 pages.

\* cited by examiner

FAST ESTIMATION OF BINARY DATA LENGTH USING MEMORY CORRUPTION

CROSS-REFERENCE

This application claims priority to U.S. Provisional Application No. 61/479,227, filed Apr. 26, 2011, and the entire contents are hereby incorporated by reference.

FIELD

The various embodiments described herein generally relate to a method and system for processing variable length data.

BACKGROUND

New applications are continually being added to electronic devices. For example, various electronic devices now include a camera unit for capturing images. The camera unit produces image data that is typically encoded using the JPEG standard to produce JPEG image data. In addition, uncompressed or raw thumbnail image data corresponding to the JPEG image data is generated and appended to the end of the JPEG data. The raw thumbnail image data is then processed and displayed on the display of the electronic device for viewing by the user. Images can be continually acquired by the camera, processed and displayed on the display in this manner while the user decides which image(s) to capture and store in the device memory.

The JPEG image data is variable length data since it has a variable data size based on the elements in the scene that is captured by the camera unit. For example, the size of the JPEG datasets that result from images captured for very different scenes or under conditions in which there is a great variation in the amount of light or noise in the scene can vary quite a bit. Accordingly, the JPEG image data can vary in size depending on the image of the scene that is captured by the camera unit or the conditions under which the image is captured. This can lead to some difficulties since processing variable length image data can be challenging in certain cases.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DETAILED DESCRIPTION OF THE EMBODIMENTS

Figure 1:
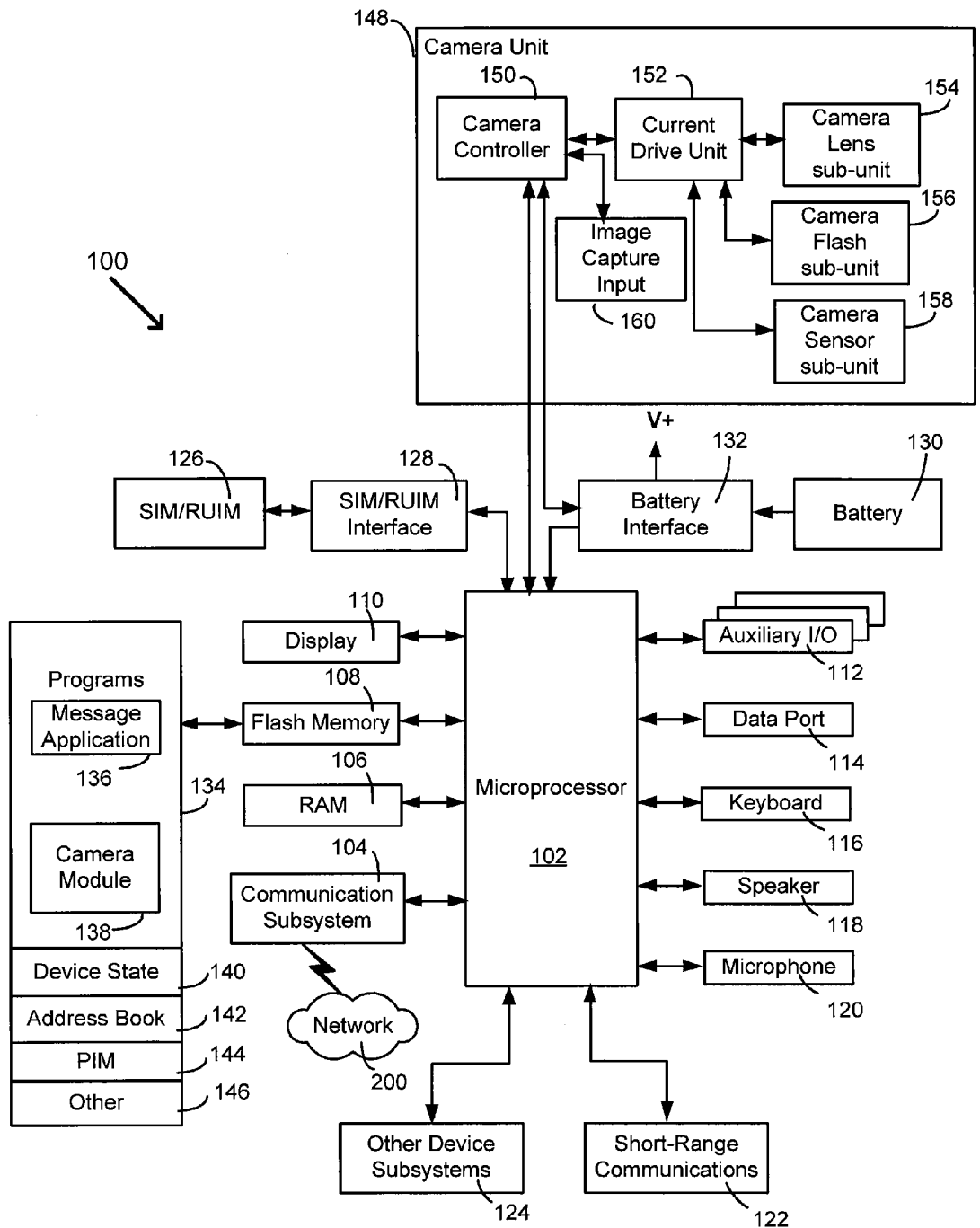
FIG. 1 is a block diagram of a mobile device having a camera unit in one example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. It should also be noted that the term coupled indicates that two elements can be directly coupled to one another or coupled to one another through one or more intermediate elements. The detailed description begins with a general description of a mobile device having a camera unit and then proceeds to describe example embodiments of a method that can be used with a device for processing image data that includes variable length data.

To aid the reader in understanding the structure of the mobile device, reference will be made to FIGS. 1 to 3. However, it should be understood that the embodiments described herein are not limited to a mobile device but can be extended to any electronic device that includes a camera or processes variable length data. Examples of such electronic devices generally include any portable electronic device that includes a camera such as cellular phones, cellular smart-phones, wireless organizers, personal digital assistants, computers, laptops, handheld wireless communication devices, wireless enabled notebook computers, tablet computers or e-readers, electronic security devices, wireless Internet appliances and the like. The electronic devices listed herein which are mobile are generally portable and thus are battery-powered and may have limited processing power. While some of these devices include wireless communication capability, others are standalone devices that do not communicate with other devices.

Referring to FIG. 1, shown therein is a block diagram of one example of a mobile device 100. The mobile device 100 comprises a number of components, the controlling component being a microprocessor 102, which controls the overall operation of the mobile device 100. Communication functions, including data and voice communications, are performed through a communication subsystem 104. The communication subsystem 104 receives messages from and sends messages to a wireless network 200. In this example, the communication subsystem 104 is configured in accordance with the Global System for Mobile Communication (GSM) and General Packet Radio Services (GPRS) standards. In other embodiments, the communication subsystem 104 can be configured in accordance with other communication standards as described below. New standards are still being defined, but it is believed that they will have similarities to the network behaviour described herein, and it will also be understood by persons skilled in the art that the various embodiments described herein should be able to be adapted to work with any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit-switched voice communications and packet-switched data communications.

Although the wireless network 200 associated with the mobile device 100 is a GSM/GPRS wireless network in this example, the mobile device 100 can be adapted to use other wireless networks in variant embodiments. For example, the different types of wireless networks that can be employed include, but are not limited to, data-centric wireless networks, voice-centric wireless networks, and dual-mode networks that can support both voice and data communications over the same physical base stations. Examples of networks also include, but are not limited to, Code Division Multiple Access (CDMA), CDMA2000 networks, GSM/GPRS networks, 3G networks like EDGE, W-CDMA and UMTS, 4G/LTE networks and future technologies such as 5G networks. Some other examples of data-centric networks include WiFi 802.11, Mobitex™ and DataTAC™ network communication systems. Examples of voice-centric data networks include Personal Communication Systems (PCS) networks like GSM and Time Division Multiple Access (TDMA) systems. Examples of communication protocols/standards that the mobile device 100 can be adapted to be used with include, but are not limited to, 3GPP and 3GPP2, High-Speed Packet Access (HSPA) standards such as High-Speed Downlink Packet Access (HSDPA), 3GPP LTE, LTE, LTE Advanced, WiMax, and Flash-OFDM.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the microprocessor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after network registration or activation procedures have been completed. Network access is associated with a subscriber or user of the mobile device 100. To identify a subscriber, the mobile device 100 may use a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, SMS, and MMS. More advanced services can include: point of sale, field service and sales force automation. The SIM card/RUIM 126 includes a processor and memory for storing information. Once the SIM card/RUIM 126 is inserted into the SIM/RUIM interface 128, it is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 can store additional subscriber information for a mobile device as well, including datebook (or calendar) information and recent call information. Alternatively, user identification information can also be programmed into the flash memory 108.

The mobile device 100 is a battery-powered device and includes a battery interface 132 and uses one or more rechargeable batteries in a battery unit 130. The battery interface 132 is coupled to a regulator (not shown), which assists the battery unit 130 in providing power V+ to the mobile device 100. Alternatively, the battery unit 130 can be a smart battery as is known in the art. Smart batteries generally include a battery processor, battery memory, switching and protection circuitry, measurement circuitry and a battery pack that includes one or more batteries, which are generally rechargeable. In either case, the one or more batteries in the battery unit 130 can be made from lithium, nickel-cadmium, lithium-ion, or other suitable composite material.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture. When the microprocessor 102 is executing any of the software applications 134, the microprocessor 102 can be considered to be configured to execute a number of steps according to the methods specified by the code of the software applications 134.

The software applications 134 include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages can be stored remotely from the device 100 such as in a data store of an associated host system that the mobile device 100 communicates with. For instance, in some cases, only recent messages can be stored within the device 100 while the older messages can be stored in a remote location such as the data store associated with a message server. This can occur when the internal memory of the device 100 is full or when messages have reached a certain "age", i.e. messages older than 3 months can be stored at a remote location. In an alternative embodiment, all messages can be stored in a remote location while only recent messages can be stored on the mobile device 100.

The mobile device 100 further includes a camera module 138, a device state module 140, an address book 142, a Personal Information Manager (PIM) 144, and other modules 146. The camera module 138 is used to control the camera operation for the mobile device 100, which includes obtaining raw thumbnail image data associated with images taken by the mobile device 100, preprocessing the raw thumbnail image data, and displaying the processed thumbnail image data on the display 110. The operation of the camera module 138 is discussed in further detail below.

The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book 142, the information can include the name, phone number, work address and email address of the contact, among other information. The other modules 146 can include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

The mobile device 100 also includes a camera unit 148 that allows a user of the mobile device 100 to take pictures. The camera unit 148 includes a camera controller 150, a current drive unit 152, a camera lens sub-unit 154, a camera flash sub-unit 156, a camera sensor sub-unit 158 and an image capture input 160. The camera controller 150 configures the operation of the camera unit 148 in conjunction with information and instructions received from the microprocessor 102 and the camera module 138. It should be noted that the structure shown for the camera unit 148 and the associated description is only one example embodiment and that the technique of obtaining camera images for viewing on the display 110 should not be limited to this example embodiment.

The camera controller 150 receives an activation signal from the microprocessor 102 when a user selects the camera mode for the mobile device 100. The camera unit 148 then determines the maximum camera flash current that can be drawn from the battery unit 130 as well as the magnitude of light that needs to be produced by the camera flash for the current physical surroundings of the mobile device 100 so that a good quality picture is taken of the scene; in this regard various techniques known to those skilled in the art can be employed. For example, current pulses of varying lengths may be used to generate the camera flash. Alternatively, a constant pulse length can be used along with a maximum amplitude setting and other elements can be varied, such as the aperture of the lens, to have the intended effect of a camera flash having a different light output.

The camera controller 150 then instructs the current drive unit 152 to generate the camera flash current that is used by the camera flash sub-unit 156 without drawing more than the maximum camera flash current that is allowable from the battery unit 130. The camera controller 150 also configures the current drive unit 152 to generate the current that is used to actuate the camera lens sub-unit 154. The current drive unit 152 may be a linear regulator in which the input current to the linear regulator and the output current of the linear regulator are equal. Alternatively, the current drive unit 152 can be a combination of a boost and a linear regulator, in order to provide an increased amount of current to the camera flash sub-unit 158 compared to the current obtained from the battery unit 130 when needed. Alternatively, the current drive unit 152 can be a combination of a buck and a linear regulator that can be used if the camera flash voltage is always less than the battery unit voltage. Alternatively, both a buck and a boost circuit can be used with a linear regulator for the current drive unit 152.

Depending on the particular configuration that is employed, the camera lens sub-unit 154 includes a lens along with a shutter and/or aperture along with components to open and close the shutter and/or aperture. Alternatively, the camera lens sub-unit 154 can include components that provide telescopic functionality to allow the user to take a "zoomed-in" or "zoomed-out" picture. In other alternatives, the camera lens sub-unit 154 can include all of these components. The structure used for each of these alternatives is known to those skilled in the art.

The camera flash sub-unit 156 includes a camera flash to generate light having an appropriate magnitude or lumen to increase the quality of the images that are obtained by the camera unit 148. However, the output of the camera flash sub-unit 156 is limited due to the limit on the current that can be drawn from the battery unit 130 for flash purposes (the limit is specified by the maximum camera flash current). The camera flash sub-unit 156 is typically based on LED flash technology. In alternative embodiments, other types of appropriate flashes can be used.

The camera sensor sub-unit 158 captures image data and sends the image data to the camera controller 150. The camera sensor sub-unit 158 also uses current for operation and receives this current from the current drive unit 152. The camera sensor sub-unit 158 can be based on CMOS sensor technology, CCD sensor technology and the like as is commonly known by those skilled in the art. The camera controller 150 converts the image data into a desired format such as JPEG image data and produces a raw thumbnail image data corresponding to the JPEG image data. The camera controller 150 then combines both the JPEG image data and the raw thumbnail image data to form image data which is then stored in a memory element of the mobile device 100, such as the RAM 106.

Typically, the image capture input 160 is a push-button actuator which is depressed by the user when the user wants to take a picture. In alternative embodiments, the image capture input 160 can be a switch or some other appropriate input mechanism as known by those skilled in the art.

In use, the user selects the camera mode for the mobile device 100, and the camera controller 150 operates the camera unit 148 to continuously take images, and continually generate the JPEG and raw thumbnail image data for a sequence of frames. The raw thumbnail image data for each frame is then obtained and processed by the microprocessor 102, or another suitable processor in alternative embodiments, in order to generate preprocessed image data which is displayed on the display 110. The display 110 is continually updated with the processed thumbnail data from the image data of subsequent frames. When the user sees an image on the display 110 that he or she wishes to capture, the user activates the image capture input 160, and the latest image is then saved by the microprocessor 102 in an appropriate memory element, such as the flash memory 108. The operation of the microprocessor 102 related to these steps is described in further detail with regards to FIG. 4.

Figure 2:
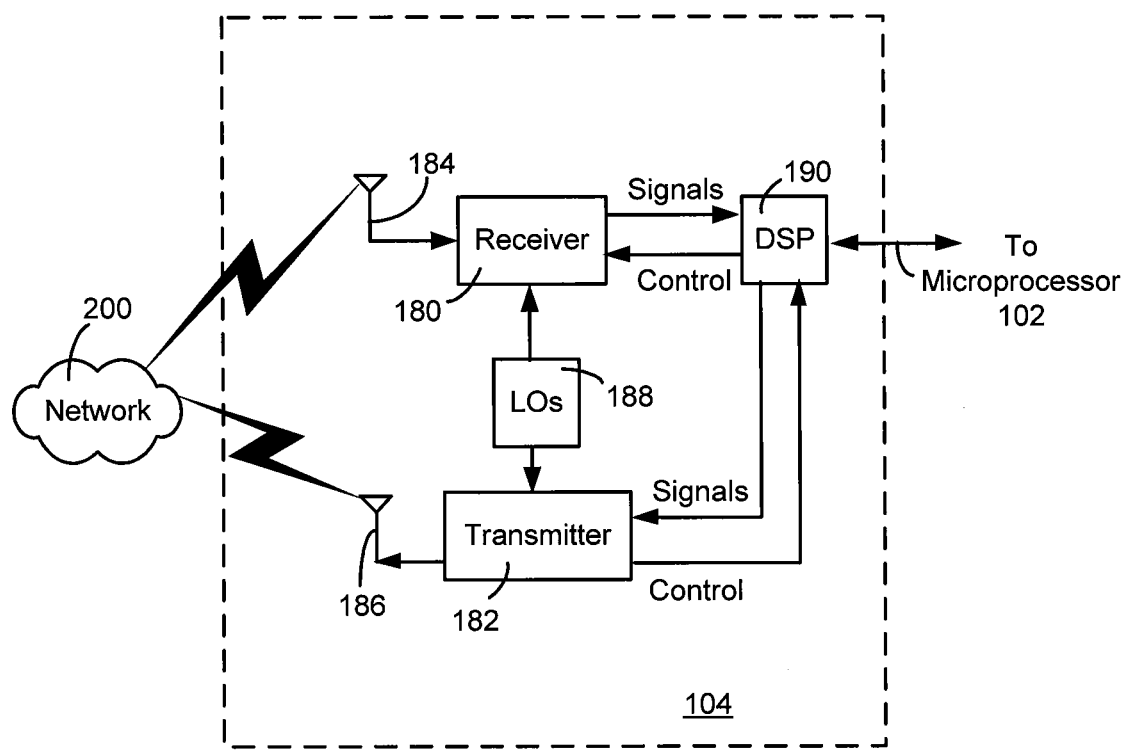
FIG. 2 is a block diagram of an example embodiment of a communication subsystem component of the mobile device of FIG. 1.

Referring now to FIG. 2, a block diagram of the communication subsystem component 104 of FIG. 1 is shown. Communication subsystem 104 comprises a receiver 180, a transmitter 182, one or more embedded or internal antenna elements 184, 186, Local Oscillators (LOs) 188, and a processing module such as a Digital Signal Processor (DSP) 190.

The particular design of the communication subsystem 104 is dependent upon the network 200 in which the mobile device 100 is intended to operate; thus, it should be understood that the design illustrated in FIG. 2 serves only as one example. Signals received by the antenna 184 through the network 200 are input to the receiver 180, which may perform such common receiver functions as signal amplification, frequency down conversion, filtering, channel selection, and analog-to-digital (A/D) conversion. A/D conversion of a received signal allows more complex communication techniques such as demodulation and decoding to be performed in the DSP 190. In a similar manner, signals to be transmitted are processed, including modulation and encoding, by the DSP 190. These DSP-processed signals are input to the transmitter 182 for digital-to-analog (D/A) conversion, frequency up conversion, filtering, amplification and transmission over the network 200 via the antenna 186. The DSP 190 not only processes communication signals, but also provides for receiver and transmitter control. For example, the gains applied to communication signals in the receiver 180 and the transmitter 182 may be adaptively controlled through automatic gain control algorithms implemented in the DSP 190.

The wireless link between the mobile device 100 and a network 200 may contain one or more different channels, typically different RF channels, and associated protocols used between the mobile device 100 and the network 200. An RF channel is a limited resource that must be conserved, typically due to limits in overall bandwidth and limited battery power of the mobile device 100.

When the mobile device 100 is fully operational, the transmitter 182 is typically keyed or turned on only when it is sending to the network 200 and is otherwise turned off to conserve resources. Similarly, the receiver 180 is periodically turned off to conserve power until it is needed to receive signals or information (if at all) during designated time periods.

Figure 3:
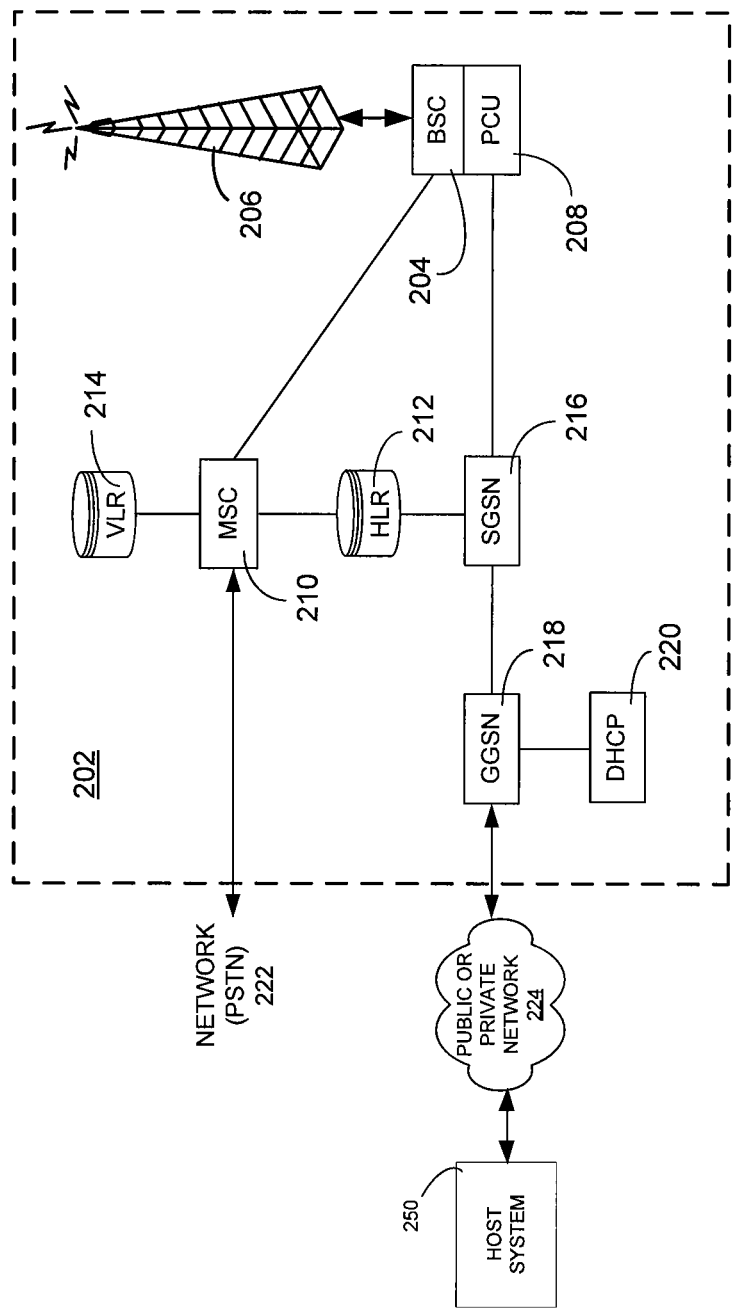
FIG. 3 is a block diagram of a node of a wireless network in one example embodiment.

Referring now to FIG. 3, a block diagram of a node of a wireless network is shown as 202. In this example embodiment, the network and its components are described for operation with General Packet Radio Service (GPRS) and Global Systems for Mobile (GSM) technologies. However, it should be understood that in other embodiments the network can be implemented in accordance with other communication protocols. In practice, the network 200 comprises one or more nodes 202. The mobile device 100 communicates with a node 202 within the wireless network 200. The node 202 is configured in accordance with GPRS and GSM technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 may be a fixed transceiver station in which case the station 206 and the BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further the VLR 214 also contains information on mobile devices that are visiting other networks. The information in the VLR 214 includes part of the permanent mobile device data transmitted from the HLR 212 to the VLR 214 for faster access. By moving additional information from a remote node of the HLR 212 to the VLR 214, the amount of traffic between these nodes can be reduced so that voice and data services can be provided with faster response times while at the same time using less computing resources.

The SGSN 216 and the GGSN 218 are elements added for GPRS support; namely packet switched data support, within GSM. The SGSN 216 and the MSC 210 have similar responsibilities within wireless network 200 by keeping track of the location of each mobile device 100. The SGSN 216 also performs security functions and access control for data traffic on the network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, GPRS capable networks use private, dynamically assigned IP addresses and thus use a DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208 and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be deallocated and the IP address returned to the IP address pool managed by the DHCP server 220.

The host system 250 may be a corporate enterprise or other local area network (LAN), but may also be a home office computer or some other private system, for example, in variant embodiments. In some cases, the host system 250 may represent a smaller part of a larger network of an organization. Typically, mobile devices communicate wirelessly with the host system 250 through one or more of the nodes 202 of the wireless network 200. The host system 250 may include one or more routers and computing devices that may operate from behind a firewall or proxy server. The proxy server routes data to the correct destination server(s) within the host system 250. For instance, the host system 250 may include a message server to send and receive messages to the mobile devices and a message management server that controls when, if, and how messages are sent to the mobile devices. The host system 250 can also include other servers that provide various functions for the host system 250 as well as data stores or databases.

As previously discussed the camera unit 148 captures JPEG image data for a scene and generates corresponding raw thumbnail image data. This JPEG image data and the raw thumbnail image data is then saved in temporary memory, such as flash memory 108. The microprocessor 102, or another processor in alternative embodiments, then processes the image data so that it can be displayed on the display 110. In order to perform this processing, the location of the raw thumbnail image data in the memory may be determined which can be difficult since the JPEG image data typically has a variable size. To further complicate this situation, typically the camera unit 148 has incomplete or poorly supported JPEG/variable length data capture modes and does not provide adequate information on the size of the JPEG image data that is stored in the flash memory 108 for image data of a recent frame. In many cases, a length parameter for the JPEG image data is not provided to the microprocessor 102. In other cases, the microprocessor 102 may obtain a length parameter for an image of a current frame. However, this length information is typically reset once the microprocessor 102 begins receiving the image data for the next frame and therefore may not be feasible for quickly locating the raw thumbnail image in the next frame. Furthermore, it can be difficult for the microprocessor 102 to read the length parameter during the frame blanking period in real-time when Interrupts are sufficiently high and inter-frame spacing is sufficiently small. Accordingly, to circumvent these issues, the camera unit 148 typically simply inserts standard JPEG markers in the image data. The standard JPEG markers include a starting marker (i.e. the Start-Of-Image (SOI) marker) and an ending marker (i.e. the End-Of-Image (EOI) marker) that are inserted before and after the JPEG image data for indicating the start and the end of the JPEG data respectively. The raw thumbnail data then follows the ending marker of the JPEG data.

The microprocessor 102 conventionally performs a JPEG search algorithm which searches for the end of the JPEG image data in the received image data. The JPEG End-Of-Image (EOI) marker is indicated with an ending marker of 0xFF 0xD9, while the JPEG Start-Of-Image (SOI) marker is indicated with a beginning or starting marker of 0xFF 0xD8. Both of these markers are in accordance with the JPEG standard. It is unlikely that these markers, or string sequences, exist anywhere in the JPEG image data, but the markers might exist in the raw thumbnail image data (also known as uncompressed thumbnail data), which will follow the ending marker. In conventional processing methodologies, the microprocessor 102 uses a search algorithm to search for the ending marker, by scanning for the SOI and EOI markers. Upon finding the ending marker, the search algorithm then determines the position of the raw thumbnail image data. While algorithmic optimizations can be done to the JPEG search algorithm, the optimizations are limited in their ability to minimize the amount of time and memory bandwidth needed to search the memory 108 for the ending marker in real-time applications, which typically require about 30 frames to be processed per second. Therefore, searching for the ending marker in this manner makes it time consuming for the microprocessor 102 to locate the raw thumbnail image data that must then be processed in order to be displayed on the display 110. This inefficient process limits the update rate of the display 110 to only about 12 to 13 times per second, which may result in dropped frames and a choppy display of images. This reduces the quality of the user's experience in using the mobile device 100 as a camera and also makes it difficult for the user to capture a desired image. The issue of slow update rate is exacerbated when the processor power is limited which typically occurs for certain electronic devices, such as mobile devices like the device 100 due to the various functions that are performed by the microprocessor 102.

Figure 4:
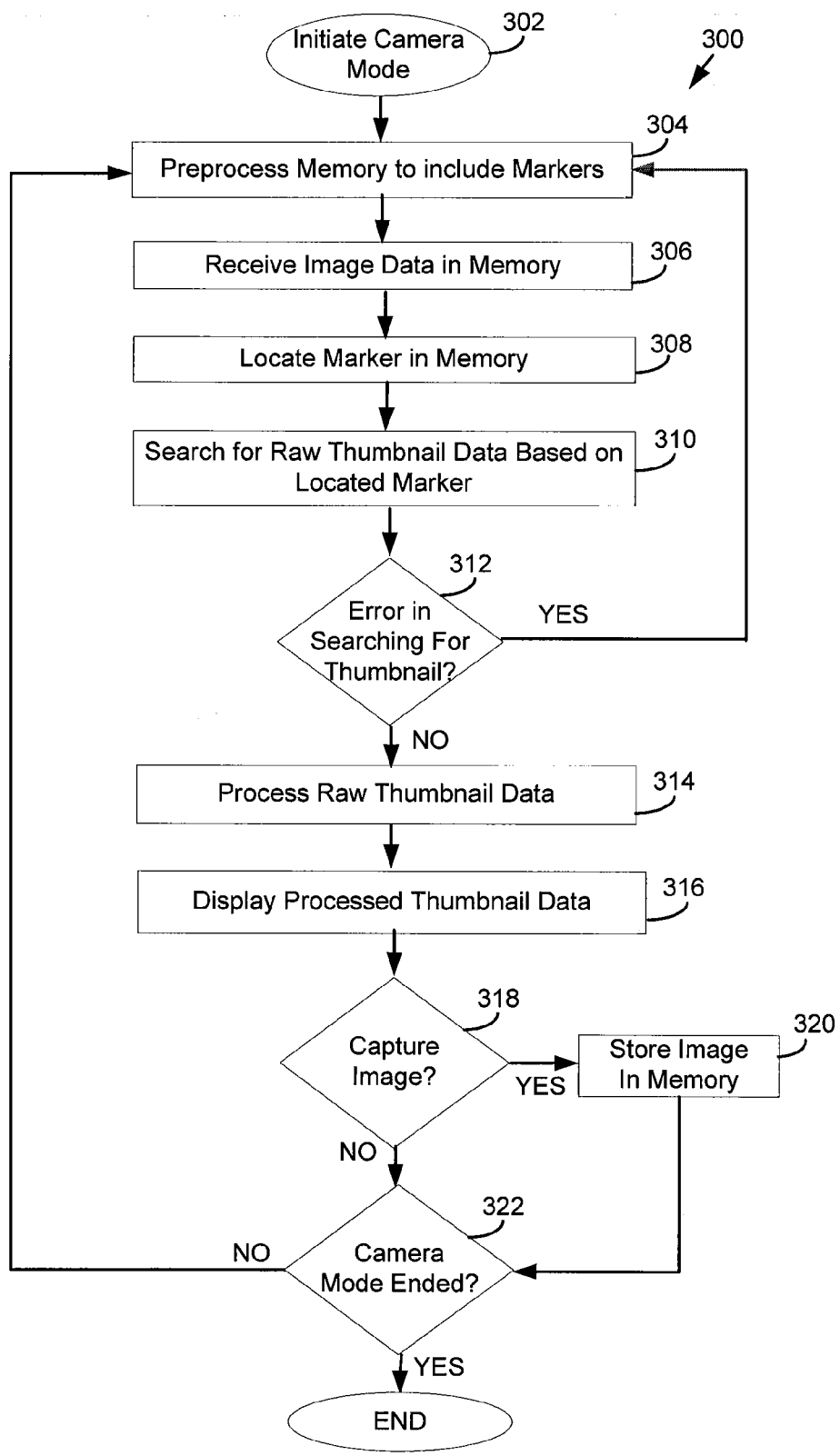
FIG. 4 is a flow chart diagram of an example embodiment of a method of processing image data including variable length data.

However, a more efficient approach can be used to locate the raw thumbnail image data by exploiting the properties of the incoming JPEG image data and the raw thumbnail image data. An example embodiment of this more efficient technique is shown in FIG. 4 as method 300. At step 302, a user selects the camera application on the mobile device 100 which initiates camera mode and starts the camera module 138. At step 304, the camera module 138 preprocesses a memory element (i.e. the RAM 106 or the flash memory 108) by allocating a portion of these memory elements, or a buffer contained within these memory elements, to receive incoming image data comprising the JPEG image data and the raw thumbnail image data for a current frame from the camera unit 148. The buffer is selected to be large enough in size so that the incoming image data fills a portion, but not all, of the buffer. For example, a buffer having a size of 5 MB can be selected since one would typically expect about 2 to 3 MB of the buffer to be filled by the incoming image data. A rule of thumb to follow can be to expect 1 MB of JPEG data for each Megapixel of resolution of the camera unit.

Once the buffer is allocated, the camera module 138 stores a plurality of locater markers, which can also be referred to as locater marker strings, in the buffer spaced apart every N bytes. Accordingly, it can be said that the locater markers within the buffer are periodic with a period equal to N since consecutive locater markers are separated by N bytes in the memory element. Different values can be chosen for N. For example, the minimum size (i.e. lower bound) for N can be the size of the locater marker. The maximum size (i.e. upper bound) for N is bounded by the fact that a larger value for N will result in a greater error in the estimate of the end of the image data. Accordingly, there is a tradeoff between how long it takes to initialize or preprocess the memory element to store the locater markers while also keeping the error in the estimate of the end of the image data within reasonable limits. The upper bound on N can be selected to be one quarter of the size of the memory element. In practice, a value of N that has been found to give good performance is about 256 bytes. However, this may vary for different embodiments. By including a spacing of N bytes, an estimate of the end of the image data can be obtained using a more efficient search technique without having to do a brute force search through the entire buffer, as explained in more detail below.

The locater marker may be a string of binary data having a certain length. For example, the locater marker can range from 1 byte to several bytes in length. However, suitable performance can be obtained by using locater markers that are generally between 1 to 8 bytes in length and in some cases between 4 to 8 bytes in length since the probability of the sequence of 4 to 8 bytes, specified in the locater markers, occurring at specific intervals in the JPEG image data is unlikely to occur. Also, JPEG image data has certain unlikely sequences which can be used to improve the selection of the binary data that is used in the locater markers such that the locater markers are unlikely to occur in the JPEG image data that is received from the camera unit 148.

At step 306, the image data is received from the camera unit 148 for the current frame. The image data can be considered to be a first dataset that contains two sub-datasets: JPEG image data that has a variable data length and terminates with an ending marker (EOI) and raw thumbnail image data that starts after the JPEG ending marker. The raw thumbnail image data has a known size based on the type of JPEG image data that is produced by the camera unit 148. For example, the raw thumbnail image data may have a size that corresponds to a resolution of 640 by 480 pixels. The received image data is stored in the buffer by overwriting the current contents of the buffer. Accordingly, a portion of the plurality of locater markers may be overwritten by the image data while the remaining locater markers are not modified. In the event that the image data is larger than the memory element, then all of the locater markers may be overwritten and the transfer of the image data should stop when the end of the buffer is reached. In this case, the current frame of image data may then be discarded and the image data for the subsequent frame may be processed.

At step 308, the method 300 searches for a first instance of the locater markers (i.e. the closest locater marker) with respect to the end of the image data that has not been overwritten in the buffer. A search algorithm such as a binary search can be used to find the location at which the locater markers have not been corrupted or in other words to locate the closet locater marker to the end of the image data which has not been overwritten by the image data of the current frame. This information, of the location of the first locater marker that has not been overwritten, then provides an estimate of the end of the image data, which is typically within N bytes of the actual end of the image data as will now be explained. In other embodiments, other suitable search algorithms can be used as long as the efficiency of the method 300 is not reduced to an unacceptable level.

If a binary search is used in step 308, then a first position at the middle of the buffer is examined to see if it has been overwritten by image data. In a first case, the portion of the buffer within N bytes of either side of this first position includes image data and a locater marker. In this case, the algorithm has determined the position of the locater marker that is closest to the end of the image data. In a second case, the buffer is not overwritten near the first position with image data which is determined when the portion of the buffer within N bytes on either side of the first position is blank and includes a locater marker. In this case, the next step of the binary search will be to examine the N bytes on either side of a second position of the buffer that is halfway between the first position and the start of the buffer. In a third case, the buffer has been completely overwritten by image data in the N bytes on either side of the first position. In this case, the next step of the binary search will be to examine the N bytes on either side of a third position of the buffer that is halfway between the current position and the end of the buffer. In the second and third cases, the binary search will continue to segment the search space in half and examine N bytes on either side of the segmentation until it finds a portion of the buffer that includes a portion of the image data and a locater marker that has not been overwritten. This locater marker is the closest locater marker to the end of the image data. The position of this locater marker is the estimated end of the image data that has been written or stored in the buffer.

At step 310, a start search position based on the position of the closest locater marker is then determined. The start search position can be determined based on the estimated end of the image data (based on the closest locater marker), the size or length of the raw thumbnail image data and a guard band. If N is 256 bytes, then the guard band can be 256 or 512 bytes. The estimated end of the image data is typically less than one locater marker distance (i.e. within N bytes) of the actual end of the image data. Therefore, if N is 256 bytes, the estimated end of the image data is typically about 255 bytes away from the actual end of the image data at most. However, there can be some rare cases in which the estimated end of the image data is underestimated by quite a bit more when the locater marker appears in certain locations. The method 300 then goes to the start search position in the memory address and starts searching forward at that point in the buffer for the ending marker of the JPEG image data. This assumes that the method 300 always underestimates the end of the image data and that the ending marker should not appear within the JPEG image data itself (based on the JPEG image standard). Since this start search position is close to the end of the JPEG image data, a linear search can be efficiently used at the start search position to locate the ending marker of the JPEG image data. Once the ending marker is located, the method 300 then identifies the location of the raw thumbnail image data since the size of the raw thumbnail image data is known and it is also known that the raw thumbnail image data will begin in the memory address that follows the ending marker of the JPEG image data.

In the event that the JPEG image data actually contains data that matches a locater marker, the estimated end of the JPEG image data may be underestimated. In this case, the search will begin to look for the ending marker of the JPEG image data at a position that is earlier than the optimal start search position (i.e. the position that is within N bytes of the ending marker for the JPEG image data). While the search will still locate the ending marker of the JPEG image data by searching through the addresses of the buffer that follow the address corresponding to the start search position, this search may be inefficient if the start search position occurs very early in the buffer and a linear search is conducted for the ending marker. In these cases, where the start search position is identified at a location that is earlier in the buffer than expected, a binary search can be performed to improve the search speed and efficiency. Alternatively, a maximum search time can be used to limit the amount of time taken by the search, since if too much time is taken to locate the ending marker of the JPEG image data, then the display 110 cannot be updated in real-time and the frame is dropped. For example, if the start search position was actually off by 1 MB of JPEG image data, then it would be difficult to meet the real-time requirement of updating the display 110 at a rate of 30 frames per second (however, this also depends on the speed of the microprocessor 102). Therefore, if the search time for the ending marker in the current frame is over the maximum search time, then an error is detected in step 312, the current frame of image data is discarded and the method 300 then goes back to step 304 to begin processing the image data associated with the subsequent frame.

If no errors are detected at step 312, then the located raw thumbnail image data is then processed by the microprocessor 102 or a dedicated image processor at step 314. This processing can include one or more operations that are known to those skilled in the art such as color space processing, scaling, filtering, blending and the like. The processed thumbnail data is then displayed on the display 110 at step 316. If at step 318, it is determined that the user has selected the image of the current frame for capture, then the method 300 proceeds to step 320 at which point the image is stored in the flash memory 108. Otherwise, if the decision at step 318 is false, then the method 300 proceeds to step 322 at which point it is determined whether the camera mode is still active for the mobile device 100. If the decision at step 318 is true, the method 300 proceeds to step 304 to perform steps 304 to 322 once more. However, if it is determined that camera mode has ended at step 320, then the method 300 ends.

Figure 5A:
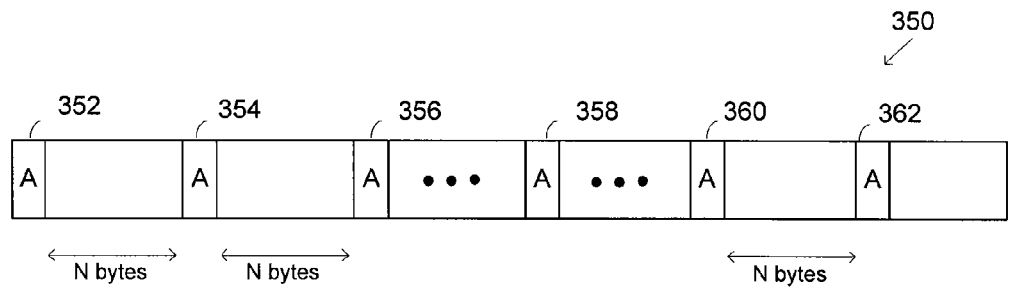
FIG. 5a is an illustration of a memory element after preprocessing according to the method of FIG. 4.

Referring now to FIG. 5a, shown therein is an illustration of a memory element 350, such as a buffer, after preprocessing according to step 304 of the method 300. The memory element 350 has been cleared and a number of locater markers 352, 354, 356, 358, 360 and 362 designated by the symbol "A" have been written at memory addresses separated by a distance of N bytes within the memory element 350. The locater markers are stored throughout the memory element 350 in this example. The locater markers "A" are advantageously separated by a distance of N bytes, which improves the execution speed of the method 300, since locater markers do not have to be written throughout the entire memory element 350 which may not impact the efficiency of the search method 300.

Figure 5B:
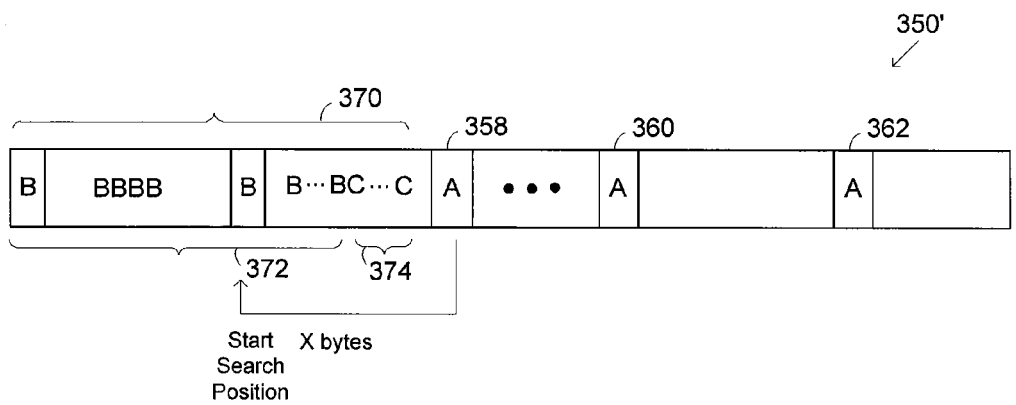
FIG. 5b is an illustration of a first example of the memory element of FIG. 5a after storing image data.

Referring now to FIG. 5b, shown therein is an illustration of a first example in which a memory element 350' has now received image data 370 according to step 306 of the method 300. The image data 370 comprises JPEG image data 372 represented by the symbols "B" and the raw thumbnail image data 374 represented by the symbols "C". These symbols are used for illustrative purposes, and it should be understood that the symbols B represent the JPEG image data, including starting and ending markers and do not indicate that there is identical data throughout the JPEG image data 372. Likewise, the symbols C are not meant to indicate identical data throughout the raw thumbnail image data 374. Furthermore, it should be noted that the number of symbols B and C in between each location where a locater marker A was previously written in memory during preprocessing is defined by the spacing N and the number of the symbols B and C shown in these figures are meant for illustrative purposes only and are not meant to be limiting.

The image data 370 has been written (i.e. stored) in the memory element 350' such that some of the locater markers have been overwritten. In this example, locater markers 358, 360 and 362 have not been overwritten and the image data 370 has been written to about less than half of the memory element 350'. Accordingly, when the search is conducted in step 310 of the method 300, the locater marker 358 is found as the first instance of the locater marker, or the closest locater marker, that follows the image data 370. The start search position is then estimated to be about X bytes before the locater marker 358 where X is the length of the raw thumbnail image data 374 plus a guard band.

Figure 6A:
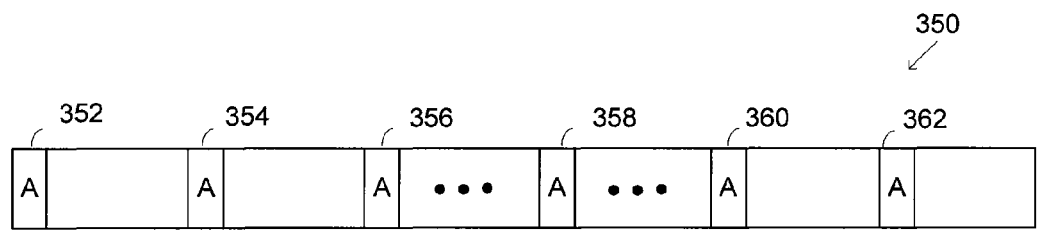
FIG. 6a is an illustration of a memory element after preprocessing according to the method of FIG. 4.
Figure 6B:
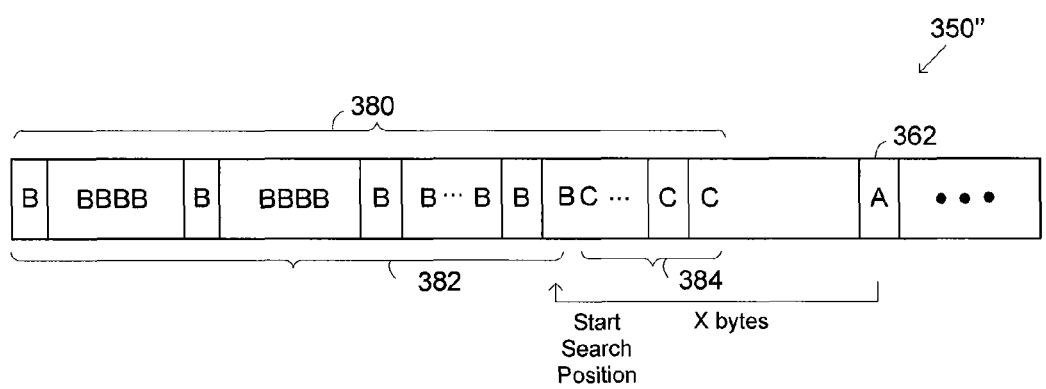
FIG. 6b is an illustration of a second example of the memory element of FIG. 6a after storing image data.

Referring now to FIGS. 6a and 6b, shown therein is the preprocessed memory element 350 before receiving image data and the preprocessed memory element 350" after receiving image data 380 comprising JPEG image data 382 and raw thumbnail image data 384. In this example, the image data 380 is quite large and overwrites a large portion of the memory element 350". The first locater marker A that follows the image data 380 is the locater marker 362. The start search position is once again estimated to be X bytes away from the locater marker 358 where X is the length of the raw thumbnail image data 384 plus a guard band.

Figure 7A:
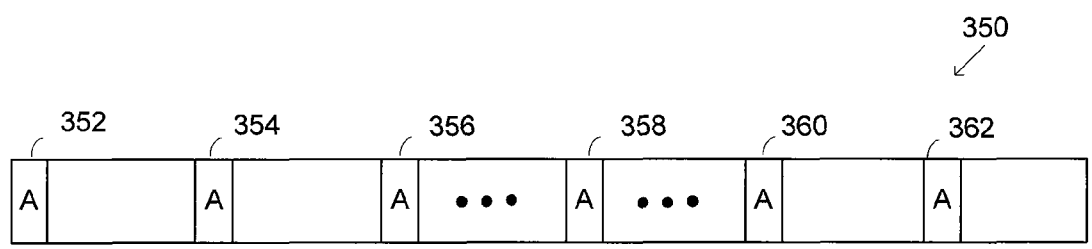
FIG. 7a is an illustration of a memory element after preprocessing according to the method of FIG. 4.
Figure 7B:
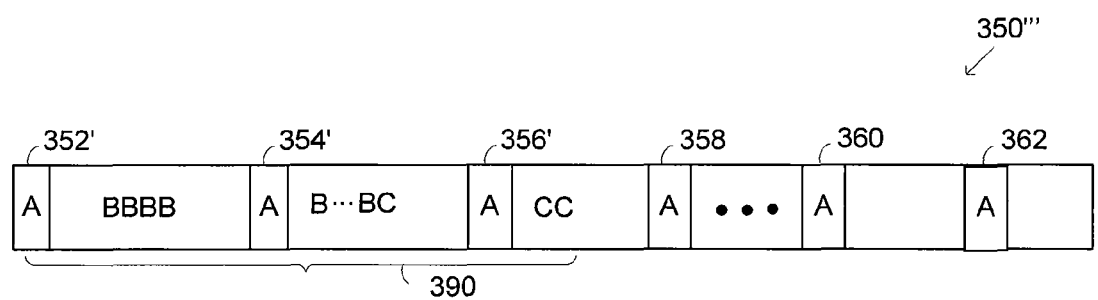
FIG. 7b is an illustration of a memory element after partial preprocessing according to an alternative version of the method of FIG. 4.

Referring now to FIGS. 7a and 7b, shown therein respectively are illustrations of memory elements 350 and 350''' after preprocessing according to method 300 and after partial preprocessing according to an alternative version of method 300 respectively. In the alternative method, rather than clearing the entire memory element 350 before storing the locater markers "A", as is shown in FIG. 7a, the memory element 350''' retains its previous content (i.e. the image data of the previous frame) and the locater markers are written over the previous content as indicated by locater markers 352', 354' and 356' in FIG. 7b. In other words, the plurality of locater markers are stored in the memory element 350''' without first clearing the memory element 350'''. This may be done for performance reasons to save time in preprocessing the memory element which will increase the execution speed of the method 300. Once the image data is stored in the memory element, the search algorithm in step 308 can be modified to locate the first instance of a locater marker that has not been overwritten and assume that it is close to the end of the new image data that was just stored in the memory element. The remainder of the method 300 operates as previously discussed.

In practice, the method 300 was evaluated on a PC and found to improve performance by a factor of at least 120 times when compared to conventional JPEG search algorithms. The performance of the method 300 when implemented on a mobile device should result in an improvement by a factor of at least 10 times given the current differences in processing power and architecture between PCs and mobile devices. This increase in speed is important since, with the increasing resolution of cameras used in mobile devices today, it is important to be able to quickly manipulate large image datasets. Furthermore, with this increase in processing speed, a zero shutter lag can be implemented which allows the mobile device 100 to display continuously updated images on the display 110 seamlessly. This will improve the viewing experience for the user and should allow the user to take better pictures because the image on the display 110 can be updated so frequently using method 300 that the user is able to capture the image that he wants to capture. This is harder to do with conventional processing methods that take longer to locate the raw thumbnail data and result in choppy images.

It should be noted that the search methodology described herein which has been applied to image data containing JPEG image data (i.e. variable length data) followed by thumbnail image data in order to locate the thumbnail image data need not be restricted to these types of datasets. In fact, the search methodology can be applied to any dataset that contains one dataset having a variable data length followed by another dataset that has a fixed data length in order to locate the fixed dataset. In this regard, steps 304 to 310 of method 300 can be applied to such datasets and need not be restricted to the application of processing image data containing JPEG image data and thumbnail image data.

In one aspect, according to at least one example embodiment described herein, there is provided a method for processing a first dataset comprising a second dataset and a third dataset in order to locate the third dataset. The second dataset has a variable data length and terminates with an ending marker and the third dataset starts after the ending marker. The method comprises: preprocessing a memory element by storing a plurality of locater markers, storing the first dataset in the memory element thereby overwriting a portion of the plurality of locater markers; locating which of the plurality of locater markers is closest to the end of the first dataset and is not overwritten; and locating the third dataset by searching for the ending marker of the second dataset based on a position of the closest locater marker.

A start search position can be set in the memory element when searching for the ending marker of the second dataset, wherein the start search position is based on the position of the closest locater marker, a length of the third dataset and a guard band.

The plurality of locater markers can be stored at addresses in the memory element that are separated by N bytes when preprocessing the memory element.

In at least some cases, a lower bound for N can be set at the length of the locater marker and an upper bound for N can be set at one-quarter of the size of the memory element. Alternatively N can be set to be 256 bytes.

In another alternative, the plurality of locater markers can be stored in the memory element without first clearing the memory element.

In at least some cases, the method can further comprise applying a binary search to locate the closest locater marker.

In at least some cases, the method further comprises applying a linear search to locate the ending marker of the second dataset after the position of the closest locater marker is determined.

In at least some cases, the method further comprises applying a binary search to locate the ending marker of the second dataset when the position of the closest locater marker is identified at a location that is earlier than expected.

In some cases, the first dataset can be image data for a current frame, the second dataset can be JPEG image data and the third dataset can be raw thumbnail image data, wherein the method can further comprise setting a maximum search time to search for the ending marker of the JPEG image data and when the maximum search time for searching for the ending marker of the JPEG data for the current frame is exceeded, the current frame is discarded and a subsequent frame is processed.

In at least some cases, the locater marker can be selected to be between 1 and 8 bytes in length.

In another aspect, according to at least one example embodiment described herein, there is provided a method for processing image data of a current frame on an electronic device, the image data comprising JPEG image data and raw thumbnail image data, the JPEG image data having a variable data length and terminating with an ending marker and the raw thumbnail image data starting after the ending marker. The method comprises preprocessing a memory element by storing a plurality of locater markers, storing the image data in the memory element thereby overwriting a portion of the plurality of locater markers, locating which of the plurality of locater markers is closest to the end of the image data and is not overwritten, locating the third dataset by searching for the ending marker of the JPEG image data based on a position of the closest locater marker, processing the located raw thumbnail image data to prepare the located raw thumbnail image data for viewing; and displaying the processed thumbnail image data on a display of the electronic device.

In another aspect, according to at least one example embodiment described herein, there is provided an electronic device comprising a microprocessor configured to control the operation of the electronic device; and a memory element coupled to the microprocessor and configured to store datasets. The microprocessor is adapted to process a first dataset comprising a second dataset and a third dataset in order to locate the third dataset, the second dataset having a variable data length and terminating with an ending marker and the third dataset starting after the ending marker. The microprocessor is adapted to preprocess the memory element to store a plurality of locater markers, store the first dataset in the memory element thereby overwriting a portion of the plurality of locater markers, locate which of the plurality of locater markers is closest to the end of the first dataset and is not overwritten, and locate the third dataset by searching for the ending marker of the second dataset based on a position of the closest locater marker.

The microprocessor can be adapted to set a start search position in the memory element when searching for the ending marker of the second dataset, wherein the start search position is based on the position of the closest locater marker, a length of the third dataset and a guard band.

The microprocessor can be adapted to store the plurality of locater markers at addresses in the memory element that are separated by N bytes when preprocessing the memory element.

In at least some cases, the microprocessor can be adapted to set N based on a lower bound equal to the length of the locater marker and an upper bound equal to one-quarter of the size of the memory element. Alternatively, the microprocessor can be adapted to set N to 256 bytes.

In an alternative, the microprocessor can be adapted to store the plurality of locater markers in the memory element without first clearing the memory element.

In at least some cases, the microprocessor can be adapted to apply a binary search to locate the closest locater marker.

In at least some cases, the microprocessor is further adapted to apply a linear search to locate the ending marker of the second dataset after the position of the closest locater marker is determined.

In at least some cases, the microprocessor is further adapted to apply a binary search to locate the ending marker of the second dataset when the position of the closest locater marker is identified at a location that is earlier than expected.

The electronic device can further comprise a camera unit that is configured to generate image data for a current frame, wherein the second dataset is JPEG image data and the third dataset is raw thumbnail image data, and wherein the microprocessor can be adapted to set a maximum search time to search for the ending marker of the JPEG image data and when the maximum search time for searching for the ending marker of the JPEG data for the current frame is exceeded, the current frame is discarded and a subsequent frame is processed.

In at least some cases, the microprocessor can be adapted to select the locater marker to be between 1 and 8 bytes in length.

In another aspect, according to at least one example embodiment described herein, there is provided a computer readable medium comprising a plurality of instructions executable on a microprocessor of an electronic device for adapting the electronic device to implement a method of processing a first dataset comprising a second dataset and a third dataset in order to locate the third dataset. The second dataset has a variable data length and terminates with an ending marker and the third dataset starts after the ending marker. The method comprises preprocessing a memory element of the electronic device by storing a plurality of locater markers, storing the first dataset in the memory element thereby overwriting a portion of the plurality of locater markers, locating which of the plurality of locater markers is closest to the end of the first dataset and is not overwritten, and locating the third dataset by searching for the ending marker of the second dataset based on a position of the closest locater marker.

In another aspect, according to at least one example embodiment described herein, there is provided a method for processing a dataset comprising data having a variable data length and terminating with an ending marker. The method comprises preprocessing a memory element by storing a plurality of locater markers; storing the dataset in the memory element thereby overwriting a portion of the plurality of locater markers; and locating which of the plurality of locater markers is closest to the end of the dataset and is not overwritten.

In another aspect, according to at least one example embodiment described herein, there is provided an electronic device comprising a microprocessor configured to control the operation of the electronic device; and a memory element coupled to the microprocessor and configured to store datasets. The microprocessor is adapted to process a dataset comprising data having a variable data length and terminating with an ending marker. The microprocessor is adapted to preprocess the memory element to store a plurality of locater markers, store the dataset in the memory element thereby overwriting a portion of the plurality of locater markers; and locate which of the plurality of locater markers is closest to the end of the dataset and is not overwritten.

It should be understood that various modifications can be made to the embodiments described and illustrated herein, without departing from the embodiments, the general scope of which is defined in the appended claims. For example, the technique described herein can be applied to other peripheral devices where variable length data is received and there is no reasonable means to quickly compute the data length. In addition, the technique can be adapted to process a stream of incoming JPEG image datasets. In this case, a memory element is preprocessed as described in method 300 (or the alternative of FIG. 7*b*) and a JPEG image dataset is received for a current frame and stored within the memory element. The end of the JPEG image data can then be determined by finding the locater marker that is closest to the end of the JPEG image data and is not overwritten. The end of the JPEG image data can then be obtained as previously described in method 300. This allows the JPEG image data to be quickly located and used for further processing. For example, once the JPEG image data is located it can be processed to generate thumbnail image data.

The invention claimed is:

1. A method for processing a first dataset comprising a second dataset and a third dataset in order to locate the third dataset, the second dataset having a variable data length and terminating with an ending marker and the third dataset starting after the ending marker, wherein the method comprises:
   preprocessing a memory element by storing a plurality of locater markers in the memory element, each locater marker having an identifiable pattern, wherein the plurality of locater markers and the first dataset are located on the same portion of the memory;
   storing the first dataset in the memory element during which one or more of the plurality of locater markers is overwritten with at least a portion of the first dataset;
   locating a closest locater marker from the plurality of locater markers, the closest locater marker being one of the locater markers that is closest to an end of the first dataset and is not overwritten; and
   locating the third dataset by searching for the ending marker of the second dataset based on a position of the closest locater marker.

2. The method of claim 1, wherein the method further comprises setting a start search position in the memory element when searching for the ending marker of the second dataset, wherein the start search position is based on the position of the closest locater marker, a length of the third dataset and a guard band.

3. The method of claim 1, wherein the method further comprises storing the plurality of locater markers at addresses in the memory element that are separated by N bytes when preprocessing of the memory element.

4. The method of claim 3, wherein a lower bound for N is the length of the locater marker and an upper bound for N is one-quarter of the size of the memory element.

5. The method of claim 3, wherein the method further comprises setting N to 256 bytes.

6. The method of claim 3, wherein the method further comprises storing the plurality of locater markers in the memory element without first clearing the memory element.

7. The method of claim 1, wherein the method further comprises applying a binary search to locate the closest locater marker.

8. The method of claim 1, wherein the method further comprises applying a linear search to locate the ending marker of the second dataset after the position of the closest locater marker is determined.

9. The method of claim 1, wherein the method further comprises applying a binary search to locate the ending marker of the second dataset when the closest locater marker is identified at a location that is earlier than N bytes of the ending marker.

10. The method of claim 1, wherein the first dataset is image data for a current frame, the second dataset is JPEG image data and the third dataset is raw thumbnail image data, wherein the method further comprises setting a maximum search time to search for the ending marker of the JPEG image data and when the maximum search time for searching for the ending marker of the JPEG data for the current frame is exceeded, the current frame is discarded and a subsequent frame is processed.

11. The method of claim 1, wherein the method further comprises selecting the locater marker to be between 1 and 8 bytes in length.

12. A method for processing image data of a current frame on an electronic device, the image data comprising JPEG image data and raw thumbnail image data, the JPEG image data having a variable data length and terminating with an ending marker and the raw thumbnail image data starting after the ending marker, wherein the method comprises:
   preprocessing a memory element by storing a plurality of locater markers in the memory element, each locater marker having an identifiable pattern, wherein the plurality of locater markers and the first dataset are located on the same portion of the memory;
   storing the image data in the memory element during which one or more of the plurality of locater markers is overwritten with at least a portion of the image data;
   locating a closest locater marker from the plurality of locater markers, the closest locater marker being one of the locater markers that is closest to an end of the image data and is not overwritten;
   locating the raw thumbnail image data by searching for the ending marker of the JPEG image data based on a position of the closest locater marker;
   processing the located raw thumbnail image data to prepare the located raw thumbnail image data for viewing; and
   displaying the processed thumbnail image data on a display of the electronic device.

13. An electronic device comprising:
   a microprocessor configured to control the operation of the electronic device; and
   a memory element coupled to the microprocessor and configured to store datasets,
wherein the microprocessor is adapted to process a first dataset comprising a second dataset and a third dataset in order to locate the third dataset, the second dataset having a variable data length and terminating with an ending marker and the third dataset starting after the ending marker,
wherein the microprocessor is adapted to preprocess the memory element to store a plurality of locater markers in the memory element, each locater marker having an identifiable pattern, wherein the plurality of locater markers and the first dataset are located on the same portion of the memory, store the first dataset in the memory element during which one or more of the plurality of locater markers is overwritten with at least a portion of the first dataset; locate a closest locater marker from the plurality of locater markers, the closest locater marker being one of the locater markers that is closest to an end of the first dataset and is not overwritten; and locate the third dataset by searching for the ending marker of the second dataset based on a position of the closest locater marker.

14. The electronic device of claim 13, wherein the microprocessor is adapted to set a start search position in the memory element when searching for the ending marker of the second dataset, wherein the start search position is based on the position of the closest locater marker, a length of the third dataset and a guard band.

15. The electronic device of claim 13, wherein the microprocessor is adapted to store the plurality of locater markers at addresses in the memory element that are separated by N bytes when preprocessing the memory element.

16. The electronic device of claim 15, wherein the microprocessor is adapted to set N based on a lower bound equal to the length of the locater marker and an upper bound equal to one-quarter of the size of the memory element.

17. The electronic device of claim 15, wherein the microprocessor is adapted to set N to 256 bytes.

18. The electronic device of claim 15, wherein the microprocessor is adapted to store the plurality of locater markers in the memory element without first clearing the memory element.

19. The electronic device of claim 13, wherein the microprocessor is adapted to apply a binary search to locate the closest locater marker.

20. The electronic device of claim 13, wherein the microprocessor is further adapted to apply a linear search to locate the ending marker of the second dataset after the position of the closest locater marker is determined.

21. The electronic device of claim 13, wherein the microprocessor is further adapted to apply a binary search to locate the ending marker of the second dataset when the closest locater marker is identified at a location that is earlier than N bytes of the ending marker.

22. The electronic device of claim 13, wherein the electronic device further comprises a camera unit that is configured to generate image data for a current frame, wherein the second dataset is JPEG image data and the third dataset is raw thumbnail image data, and wherein the microprocessor is adapted to set a maximum search time to search for the ending marker of the JPEG image data and when the maximum search time for searching for the ending marker of the JPEG data for the current frame is exceeded, the current frame is discarded and a subsequent frame is processed.

23. The electronic device of claim 13, wherein the microprocessor is adapted to select the locater marker to be between 1 and 8 bytes in length.

24. A non-transitory computer readable medium comprising a plurality of instructions executable on a microprocessor of an electronic device for adapting the electronic device to implement a method of processing a first dataset comprising a second dataset and a third dataset in order to locate the third dataset, the second dataset having a variable data length and terminating with an ending marker and the third dataset starting after the ending marker, wherein the method comprises:
preprocessing a memory element of the electronic device by storing a plurality of locater markers in the memory element, each locater marker having an identifiable pattern, wherein the plurality of locater markers and the first dataset are located on the same portion of the memory;
storing the first dataset in the memory element during which one or more of the plurality of locater markers is overwritten with at least a portion of the first dataset;
locating a closest locater marker from the plurality of locater markers, the closest locater marker being one of the locater markers that is closest to an end of the first dataset and is not overwritten; and
locating the third dataset by searching for the ending marker of the second dataset based on a position of the closest locater marker.

25. A method for processing a dataset having a variable data length and terminating with an ending marker, wherein the method comprises:
preprocessing a memory element by storing a plurality of locater markers in the memory element, each locater marker having an identifiable pattern, wherein the plurality of locater markers and the first dataset are located on the same portion of the memory;
storing the dataset in the memory element during which one or more of the plurality of locater markers is overwritten with at least a portion of the dataset; and
locating a closest locater marker from the plurality of locater markers, the closest locater marker being one of the locater markers that is closest to an end of the dataset and is not overwritten.

26. An electronic device comprising:
a microprocessor configured to control the operation of the electronic device; and
a memory element coupled to the microprocessor and configured to store datasets,
wherein the microprocessor is adapted to process a dataset comprising data having a variable data length and terminating with an ending marker, and
wherein the microprocessor is adapted to preprocess the memory element to store a plurality of locater markers in the memory element, each locater marker having an identifiable pattern, wherein the plurality of locater markers and the first dataset are located on the same portion of the memory, store the dataset in the memory element during which one or more of the plurality of locater markers is overwritten by at least a portion of the dataset; and locate a closest locater marker from the plurality of locater markers, the closest locater marker being one of the locater markers that is closest to an end of the dataset and is not overwritten.

* * * * *

UNITED STATES PATENT AND TRADEMARK OFFICE
CERTIFICATE OF CORRECTION

PATENT NO. : 9,137,443 B2  
APPLICATION NO. : 13/246033  
DATED : September 15, 2015  
INVENTOR(S) : Brett Foster Page 1 of 1

It is certified that error appears in the above-identified patent and that said Letters Patent is hereby corrected as shown below:

Column 19, Line 9, In Claim 1, after "wherein" delete "the".

Column 19, Line 10, In Claim 1, delete "are" and insert -- being --, therefor.

Column 20, Line 5, In Claim 12, after "wherein" delete "the".

Column 20, Line 6, In Claim 12, delete "are" and insert -- being --, therefor.

Column 20, Line 38, In Claim 13, after "wherein" delete "the".

Column 20, Line 39, In Claim 13, delete "are" and insert -- being --, therefor.

Column 21, Line 38, In Claim 24, after "wherein" delete "the".

Column 21, Line 39, In Claim 24, delete "are" and insert -- being --, therefor.

Column 22, Line 13, In Claim 25, after "wherein" delete "the".

Column 22, Line 14, In Claim 25, delete "are" and insert -- being --, therefor.

Column 22, Line 33, In Claim 26, after "wherein" delete "the".

Column 22, Line 34, In Claim 26, delete "are" and insert -- being --, therefor.

Signed and Sealed this  
Fifth Day of July, 2016

Michelle K. Lee  
*Director of the United States Patent and Trademark Office*